No. 721,175. PATENTED FEB. 24, 1903.
S. H. FROST & G. W. SOUTHWICK.
VEHICLE SPRING.
APPLICATION FILED MAY 13, 1902.
NO MODEL.

WITNESSES
INVENTORS
Samuel H. Frost, and
George W. Southwick.
by Herbert W. S. Jenner.
Attorney

UNITED STATES PATENT OFFICE.

SAMUEL H. FROST AND GEORGE W. SOUTHWICK, OF FRANKLIN, MASSACHUSETTS.

VEHICLE-SPRING.

SPECIFICATION forming part of Letters Patent No. 721,175, dated February 24, 1903.

Application filed May 13, 1902. Serial No. 107,091. (No model.)

*To all whom it may concern:*

Be it known that we, SAMUEL H. FROST and GEORGE W. SOUTHWICK, citizens of the United States, residing at Franklin, in the county of Norfolk and State of Massachusetts, have invented certain new and useful Improvements in Vehicle-Springs; and we do hereby declare the following to be a full, clear, and exact description of the invention, such as will enable others skilled in the art to which it appertains to make and use the same.

This invention relates to springs for vehicles; and it consists in the novel construction and combination of the parts hereinafter fully described and claimed and by which the springs are connected together.

Figure 1:
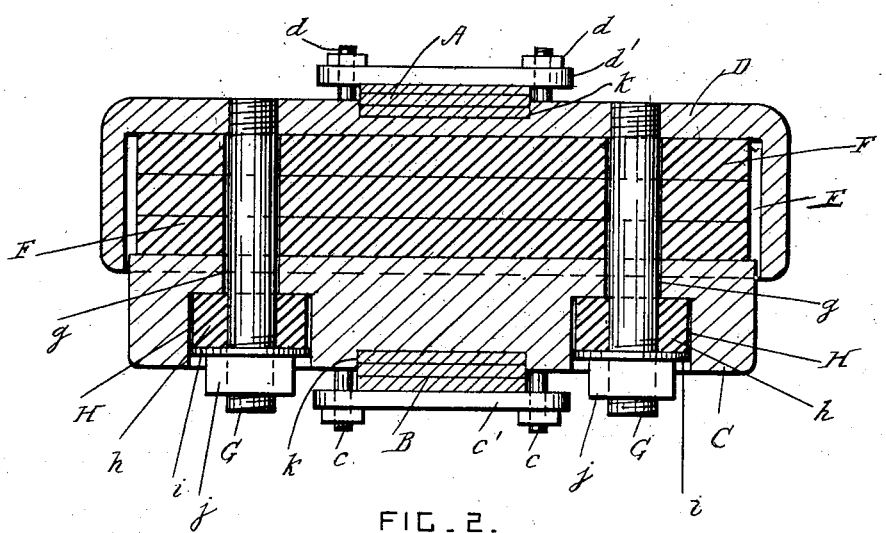
Figure 2:
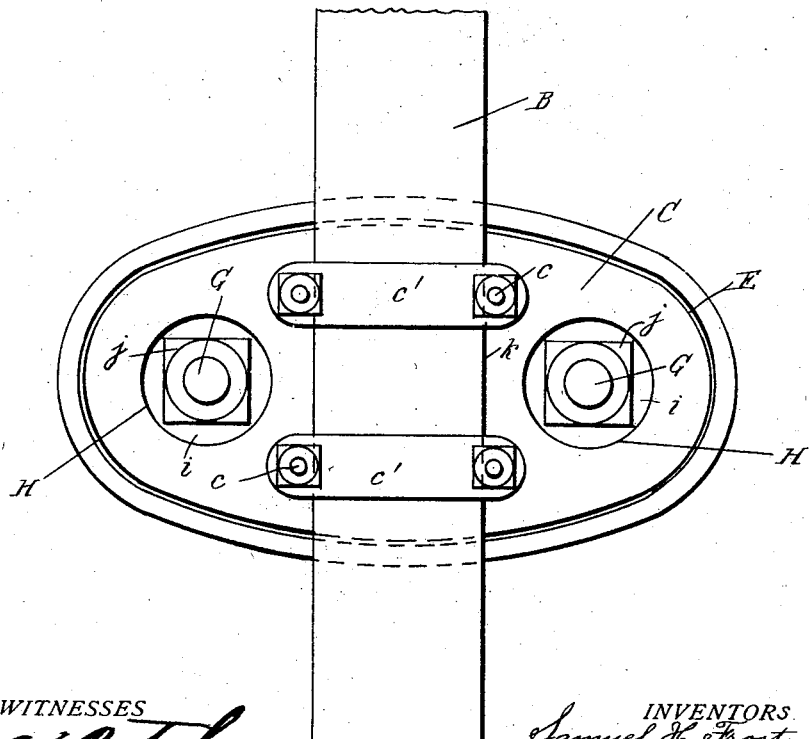

In the drawings, Figure 1 is a longitudinal section through the spring connection. Fig. 2 is a plan view from below of the spring connection.

This spring connection is more particularly intended for use in connection with automobiles to prevent jar.

A and B are two leaf-springs of any approved construction used in carriage-making. The lower spring A has an oval block C rigidly secured to it by bolts $c$ and plates $c'$. The upper spring B has an oval block D rigidly secured to it by bolts $d$ and plates $d'$. The block D has a chamber E on its under side, which overlaps the block C; and F represents plates, of india-rubber or other elastic material, arranged one above the other and forming a buffer between the blocks C and D inside the chamber E.

G represents stud-bolts screwed into the block D and passing through holes in the plates F and holes $g$ in the lower block C.

H represents countersunk holes in the lower side of the block C, and $h$ are washers, of india-rubber or other elastic material, arranged in the countersunk holes H around the bolts G. Metallic washers $i$ are also placed in the holes H over the elastic washers for the nuts $j$ of the bolts G to bear against. Each block is provided with a recess $k$, which forms a seat for the spring.

The leaf-springs are connected to the vehicle in any approved manner, and the india-rubber plates or buffer and the india-rubber washers prevent all jar.

What we claim is—

The combination, with an upper block and a lower block provided with recesses, upper and lower springs arranged in the said recesses, and clamping stud-bolts and plates securing the said springs in the said recesses; of plates of elastic material arranged between the said blocks, bolts passing through holes in the said plates and connecting the said blocks, said bolts being arranged one on each side of the said springs, and washers of elastic material arranged on the under side of the said lower block between it and the nuts of the said bolts which pass through it, substantially as set forth.

In testimony whereof we affix our signatures in presence of two witnesses.

SAMUEL H. FROST.
GEORGE W. SOUTHWICK.

Witnesses:
ALICE J. MURRAY,
FREDK. K. DAGGETT.